United States Patent

[11] 3,604,541

[72] Inventor Ernst Menzi
       Widnau, Switzerland
[21] Appl. No. 838,525
[22] Filed July 2, 1969
[45] Patented Sept. 14, 1971
[73] Assignee Ernst Menzi A.G.
       Widnau, Switzerland
[32] Priority July 5, 1968
[33] Austria
[31] A6510/68

[54] ELECTROMAGNETICALLY ACTUATED BRAKE
     6 Claims, 6 Drawing Figs.
[52] U.S. Cl. .................................................. 188/164,
                                                         188/73.2
[51] Int. Cl. ..................................................... F16d 65/34
[50] Field of Search ........................................... 188/73.1,
                                    73.2, 161, 164, 250 B, 257

[56] References Cited
UNITED STATES PATENTS
2,068,654  1/1937  Cadman ........................ 188/164 X
2,290,406  7/1942  Chambers ..................... 188/164
2,650,682  9/1953  Oetzel .......................... 188/164
3,458,022  7/1969  Reiff ............................ 188/161 X Primary Examiner—Duane A. Reger
Attorney—Kelman and Berman ABSTRACT: A brake in which a cam expands brakeshoes into engagement with a rotating brake drum when the cam is turned by a motion-transmitting train connected to an annular electromagnet freely movable on the shaft which carries the drum. The magnet stands still when not energized and is axially attracted toward an armature disc on the shaft and angularly displaced by the rotating disc when energized. Full frictional engagement between the annular pole face of the magnet and the opposite face of the armature disc could block the brake and is prevented by a setscrew on the brake drum which deflects a small abutment portion of the disc axially toward the pole face.

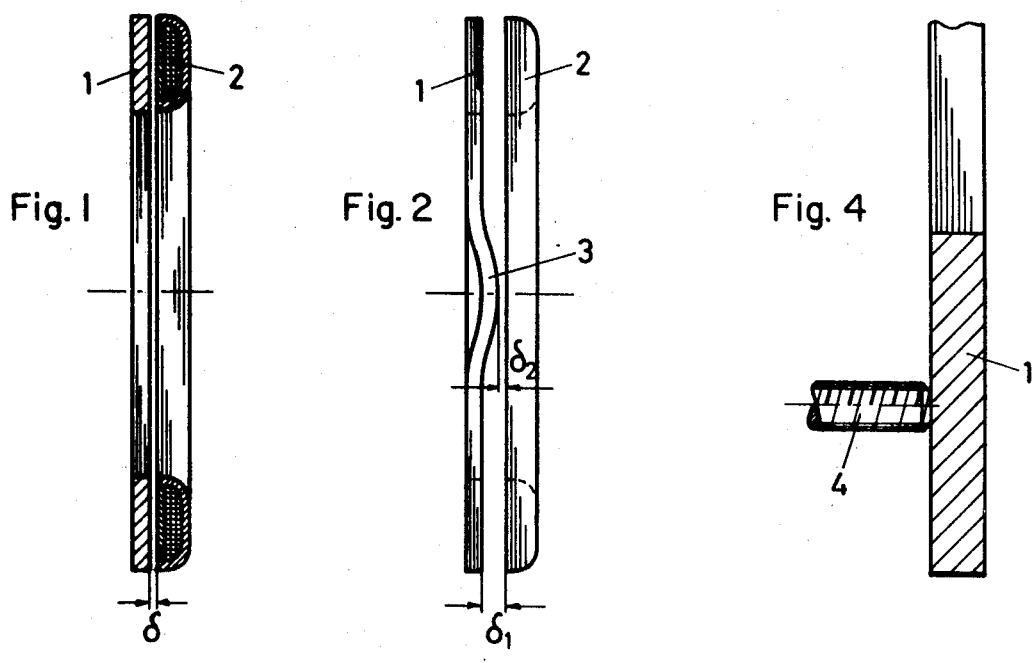
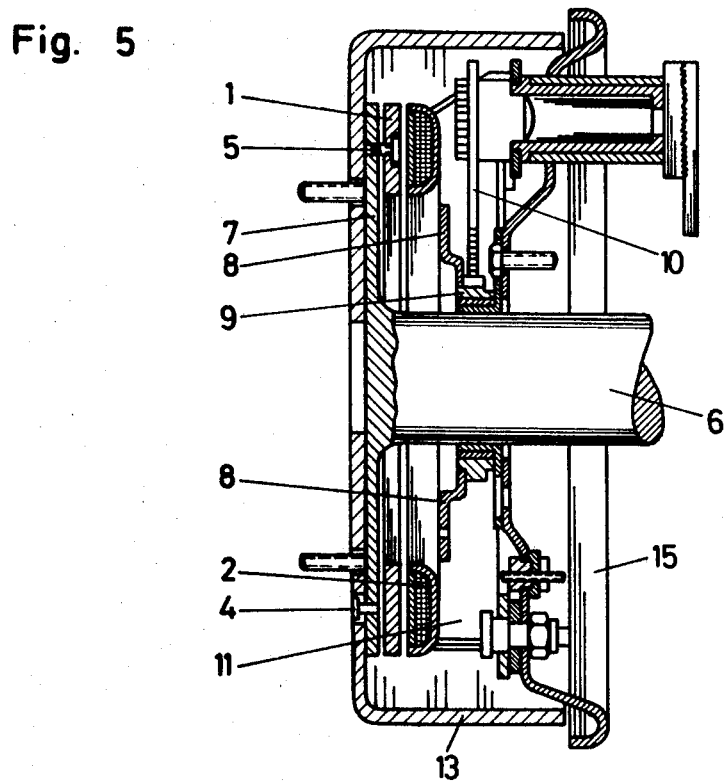

ELECTROMAGNETICALLY ACTUATED BRAKE

BACKGROUND OF THE INVENTION

This invention relates to electromagnetically actuated brakes, and more specifically to brakes in which cooperating brake elements on a supporting structure and on a shaft rotatably mounted on the supporting structure are engaged in response to the energizing of an electromagnet.

More specifically, this invention is concerned with improvements in a basically known type of brake arrangement in which an electromagnet is normally stationary on the supporting portion of a machine, but is coupled to a rotating machine part when energized so that it is angularly displaced relative to the axis of rotation, and a motion-transmitting train engages the braking mechanism in response to the angular movement of the electromagnet.

Known applications of such brakes include brakes for vehicles and for various machines, and the term "machine," as used hereinafter, will be understood to include vehicles, the supporting structure of the vehicle being constituted by the frame and body, and the brake being used for impeding rotation of a wheel.

The known brakes of the type described have a tendency to engage quite suddenly. The resulting sudden blocking of a vehicle wheel or other machine part is usually undesirable, and it has not been possible heretofore to achieve the reliably smooth application of a gradually increasing braking force as is necessary in vehicle brakes, but also in other applications.

A primary object of the invention is an improvement in the basically known electromagnetically actuated brake arrangement described above which reliably provides the desired gradual engagement of the brake when the magnet is energized, and avoids sudden blocking of the rotating machine part.

SUMMARY OF THE INVENTION

With this object and others in view, as will hereinafter become apparent, the invention provides a modification of an arrangement in which a shaft is rotatable on a support about an axis, and an electromagnet is mounted on the support for axial movement and for angular displacement relative to the axis. An armature member which has an engagement face opposite a pole face of the electromagnet is mounted on the shaft for rotation therewith, and respective portions of the two faces, circumferentially and radially coextensive, bound an airgap between the armature member and the electromagnet. When the electromagnet is energized, it is axially attracted by the magnetic field toward the armature member and angularly displaced about the axis when the shaft rotates. Cooperating brake elements on the shaft and on the support are coupled to the electromagnet in such a manner that they are engaged and thereby impede the rotation of the shaft in response to the angular displacement of the electromagnet.

A basic feature of this invention is a protuberance on one of the two opposite faces, preferably the engagement face of the armature member, which has an axial dimension sufficient to abuttingly engage the other face, preferably the pole face of the electromagnet, when the latter is attracted toward the armament member and thereby to prevent frictional engagement of more than a small fraction of the coextensive portions of the aforementioned engagement and pole faces. An axially terminal abutment face on the protuberance thus is the only element on the armature member which can make frictional contact with the electromagnet, and the area of this abutment face is made very much smaller than the area of each of the coextensive face portions.

Other features and many of the attendant advantages of this invention will readily become apparent when the same is better understood from the following detailed description of a preferred embodiment when considered in connection with the appended drawing.

BRIEF DESCRIPTION OF THE DRAWING

In the drawing:

FIG. 1 shows an armature disc and an annular electromagnet of the apparatus of FIG. 5 in a partly enlarged, axially sectional view;

FIG. 2 shows the device of FIG. 1 in a radial view in a different condition;

FIG. 4 shows the device of FIG. 3 in fragmentary axial section on the line IV—IV, and on a larger scale;

FIG. 5 shows a brake arrangement of the invention in axial section; and

DESCRIPTION OF THE PREFERRED EMBODIMENT

Figure 6:
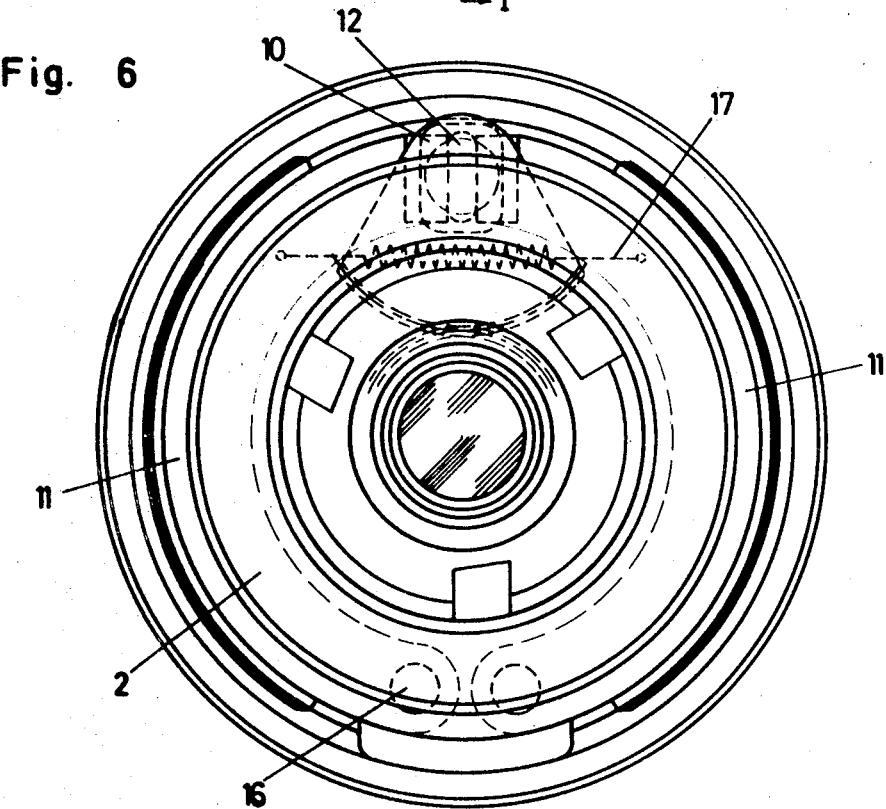
FIG. 6 shows a portion of the apparatus of FIG. 5 in axial end view from the right.

Referring now to the drawing in detail, and initially to FIGS. 5 and 6, there is shown as much of the partly conventional wheel-supporting structure of a truck as is needed for an understanding of this invention.

A brake drum 13 of conventional shape is fixedly attached to a shaft 6 by means of a flange 7. A cam 12 is radially spaced from the shaft axis and rotatable on a sheet metal cover 15 which is an element of the support structure of the vehicle, not otherwise shown. Two brake shoes 11 are mounted on the cover 15 by means of anchor pins 16 and are biased away from the brake drum 13 by a helical tension spring 17 which connects the ends of the shoes 11 adjacent the cam 12 and remote from the pins 16.

Figure 3:
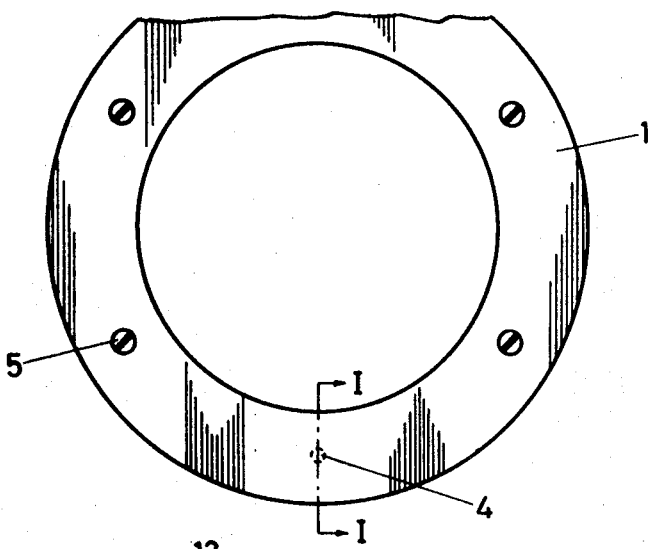
FIG. 3 shows the disc of FIGS. 1 and 2 in axial end view together with associated elements.

A gear segment 10 is fixedly fastened to the cam 12 and meshes with an annular gear rim 9 on a spider 8 which is freely movable on the shaft 6. The gear teeth of the rim 9 are axially longer than the teeth of the gear segment 10 to permit limited axial movement of the spider 8 on the shaft 6. The spider 8 carries an annular electromagnet 2 which has a flat annular pole face perpendicular to the axis of rotation of the shaft 6 and centered in the axis. An annular armature disc 1 of moderately resilient and flexible mild steel is attached to the flange 7 by four screws 5 spaced about 72° apart on a common circle about the shaft axis, as is best seen in FIG. 3. Some dimensions have been distorted in FIGS. 1 to 4 for a clearer representation of certain features of the invention.

The disc 1 is flat in the relaxed condition illustrated in FIGS. 1 and 5, and its engagement face opposite the radially and circumferentially partly coextensive pole face of the electromagnet 2 extends in a radial plane relative to the axis of the shaft 6. The head of a setscrew 4 is accessible through the bottom wall of the brake drum 13 which provides an enveloping casing for the disc 1, the electromagnet 2, and the illustrated end portion of the shaft 6. The shank of the screw 4 is threadedly received in an axial bore of the flange 7, and the free end of the screw may abuttingly engage the normally radial face of the ring 1 directed axially away from the electromagnet 2 in the corner of the regular pentagon otherwise defined by the screws 5, as is shown in FIGS. 3 and 4.

When the head of the screw 4 is turned by means of a tool inserted through the opening in the brake drum 13, a portion 3 of the disc 1 is deflected by the motion-transmitting free shank end from the radial plane in which the remainder of the disc is held by the screws 5, as is shown in FIG. 2 with substantial dimensional exaggeration for the sake of clarity.

A weak return spring, not shown, normally holds the electromagnet 2 in the illustrated position in which a uniform airgap δ separates the opposite faces of the disc 1 and of the electromagnet 2 when the disc is in the relaxed condition of FIG. 1. When the disc is partly deflected by the screw 4 so that a part of its engagement face is obliquely inclined relative to the shaft axis, the distance $δ_1$ between most of the engagement face and the pole face of the electromagnet 2 is still uniform, but the airgap between the deflected disc portion and the magnet is reduced to a smaller axial width $δ_2$ (FIG. 2).

Although the actual difference between $δ_1$ and $δ_2$ is much smaller than would be apparent from FIG. 2, and is normally only a small fraction of $δ_1$, the protuberance formed by the deflected disc portion is of sufficient axial height to prevent frictional engagement of more than a very small fraction of the radially and circumferentially coextensive portions of the annular, opposite faces when the magnet is energized. The torque transmitted from the armature disc 1 to the energized electromagnet 2 is thus predominantly a function of the readily controlled current in the winding of the electromagnet, and only to a small extent a function of the frictional forces transmitted between the opposite faces of the armature disc and of the electromagnet and not amenable to control in a convenient manner.

The brake arrangements of the invention can therefore be engaged smoothly and are free from the blocking tendency characteristic of similar known devices in which broad faces of a magnet and of an armature engage each other when the magnet is energized.

The effective axial length of the protuberance provided by the disc portion 3 can be controlled simply and very precisely by means of the setscrew 4 to determine the width of the residual gap remaining between the pole face of the magnet and most of the opposite radial face of the disc 1 when the protuberance abuts against the pole face and makes contact with the pole face over an abutment area which is only a very small fraction of the disc face.

While the invention has been described with reference to an expanding brake, more specifically a drum brake, those skilled in the art will modify it for adaptation to contracting brakes, such as band brakes, and to disc brakes, to mention only brakes now in common use on automotive vehicles. Applications to other machines and variations in the illustrated device will readily suggest themselves on the basis of the above teachings.

A protuberance may thus be provided on the pole face of the magnet 2, opposite a flat face of the disc 1. More than one setscrew 4 may be provided if so desired although a single protuberance, as illustrated, has been found quite adequate. A sufficient number of screws 4 may give the disc 1 an undulating shape in which axial stresses are more uniformly distributed about the circumference than in the illustrated embodiment.

The advantages of the invention are equally available in arrangements in which the magnet, the armature member or both are not annular, or where an annular pole piece is backed by a magnet of a shape very different from that illustrated.

What is claimed is:

1. In a machine including a support; a shaft rotatable on said support about an axis; an electromagnet mounted on said support for axial movement and for angular displacement relative to said axis, said magnet having a pole face; and armature member having an engagement face opposite said pole face, said armature member being mounted on said shaft for rotation therewith, respective portions of said faces being circumferentially and radially coextensive and axially bounding an airgap between said armature member and said electromagnet, said electromagnet when energized being axially attracted toward said armature member and angularly displaced about said axis when said shaft rotates, and cooperating engageable brake means on said shaft and on said support responsive to said angular displacement of said electromagnet for engaging said brake means and for thereby impeding the rotation of said shaft, the improvement which comprises:
   a. a protuberance on said engagement face of an axial dimension sufficient to abuttingly engage said pole face when said electromagnet is attracted toward the armature member and to prevent frictional engagement of more than a small fraction of said coextensive portions,
   b. said protuberance having an axially terminal abutment face positioned for frictional engagement with said pole face, the area of said abutment face being very much smaller than the area of said coextensive portions,
   c. said coextensive portion of said engagement face being annular about said axis and in part obliquely inclined relative to said axis, whereby a part of said portion of the engagement face is nearer said pole face than the remainder of said engagement face, said part constituting said abutment face.

2. In a machine including a support; a shaft rotatable on said support about an axis; an electromagnet mounted on said support for axial movement and for angular displacement relative to said axis, said magnet having a pole face; an armature member having an engagement face opposite said pole face, said armature member being mounted on said shaft for rotation therewith, respective portions of said faces being circumferentially and radially coextensive and axially bounding an airgap between said armature member and said electromagnet, said electromagnet when energized being axially attracted toward said armature member and angularly displaced about said axis when said shaft rotates, and cooperating engageable brake means on said shaft and on said support responsive to said angular displacement of said electromagnet for engaging said brake means and for thereby impeding the rotation of said shaft, the improvement which comprises:
   a. a protuberance on one of said faces of an axial dimension sufficient to abuttingly engage the other face when said electromagnet is attracted toward the armature member and to prevent frictional engagement of more than a small fraction of said coextensive portions,
   b. said protuberance having an axially terminal abutment face positioned for frictional engagement with said other face, the area of said abutment face being very much smaller than the area of said coextensive portions,
   c. the coextensive portion of said one face being annular about said axis and substantially extending in a plane radial relative to said axis, said protuberance projecting from said radial plane toward said other face.

3. In a machine including a support; a shaft rotatable on said support about an axis; an electromagnet mounted on said support for axial movement and for angular displacement relative to said axis, said magnet having a pole face; an armature member having an engagement face opposite said pole face, said armature member being mounted on said shaft for rotation therewith, respective portions of said faces being circumferentially and radially coextensive and axially bounding an airgap between said armature member and said electromagnet, said electromagnet when energized being axially attracted toward said armature member and angularly displaced about said axis when said shaft rotates, and cooperating engageable brake means on said shaft and on said support responsive to said angular displacement of said electromagnet for engaging said brake means and for thereby impeding the rotation of said shaft, the improvement which comprises:
   a. a protuberance on said engagement face of an axial dimension sufficient to abuttingly engage said pole face when said electromagnet is attracted toward the armature member and to prevent frictional engagement of more than a small fraction of said coextensive portions,
   b. said protuberance having an axially terminal abutment face positioned for frictional engagement with said pole face, the area of said abutment face being very much smaller than the area of said coextensive portions,
   c. said armature member being a disc of flexible material, and
   d. control means for flexing a portion of said disc axially toward said pole face, the flexed portion constituting said protuberance.

4. In a machine as set forth in claim 2, said one face being said engagement face.

5. In a machine as set forth in claim 2, controlling means for varying said axial dimension.

6. In a machine as set forth in claim 3, a casing enveloping said disc, said electromagnet and a portion of said shaft, said casing being mounted on said shaft for rotation therewith, and said control means including a control member movably mounted in said casing and accessible from outside said casing for causing the movement of the same, and motion-transmitting means connecting said control member to said disc for flexing the same in response to said movement of the control member.